US00RE39472E

(19) United States
(12) Reissued Patent
Ahn et al.

(10) Patent Number: US RE39,472 E
(45) Date of Reissued Patent: Jan. 16, 2007

(54) GOLF PUTTER HAVING IMPROVED MARKING

(76) Inventors: Stephen C. Ahn, 8809 Southlea Ct., Fairfax, VA (US) 22031; Suh Yong Lee, 4118 Amesbury La., Durham, NC (US) 27707

(21) Appl. No.: 10/740,902

(22) Filed: Dec. 22, 2003

Related U.S. Patent Documents

Reissue of:
(64) Patent No.: 6,409,610
Issued: Jun. 25, 2002
Appl. No.: 09/520,159
Filed: Mar. 7, 2000

U.S. Applications:
(63) Continuation-in-part of application No. 09/114,523, filed on Jul. 13, 1998, now Pat. No. 6,045,452.

(51) Int. Cl.
*A63B 53/04* (2006.01)
*A63B 69/36* (2006.01)

(52) U.S. Cl. ..... 473/249; 473/251; 473/330
(58) Field of Classification Search ..... 473/324, 473/330–331, 340–342, 231–254, 286, 257; D21/736–746
See application file for complete search history.

(56) References Cited

U.S. PATENT DOCUMENTS 807,736 A * 12/1905 Foulis
1,211,708 A * 1/1917 Hudson
1,467,714 A * 9/1923 Doerr
1,674,173 A 6/1928 Haupt
1,960,110 A * 5/1934 Iles ..... 473/286
2,472,978 A * 6/1949 Mahon
3,328,032 A * 6/1967 Griswold
3,333,854 A * 8/1967 White
3,408,074 A * 10/1968 Antonious
D230,615 S * 3/1974 Delgadillo ..... D21/735
3,841,640 A * 10/1974 Gaulocher ..... 473/249
3,881,733 A * 5/1975 Csernits
3,884,477 A * 5/1975 Bianco
D252,221 S * 6/1979 Mariani ..... D21/745
4,290,606 A * 9/1981 Maxwell
4,754,976 A * 7/1988 Pelz ..... 473/340
4,762,324 A * 8/1988 Anderson
4,846,477 A * 7/1989 Phelan
D312,858 S * 12/1990 Anderson
5,098,103 A * 3/1992 Mackeil
5,725,441 A * 3/1998 Jensen et al. ..... 473/251
6,045,452 A * 4/2000 Ahn
2002/0055395 A1 * 5/2002 Douglas et al. ..... 473/340

* cited by examiner

*Primary Examiner*—Sebastiano Passaniti
(74) *Attorney, Agent, or Firm*—Baker & McKenzie LLP

(57) ABSTRACT

A putter is precision machined to form a concave horizontal face from the heel to toe of the hitting face. The curvature of the concave horizontal face may range from an arc of a five circle to an arc of a one-feet radius circle with the center point at the center of the hole. Thus the putter has a curvature of the horizontal or striking face ranging from the reciprocal of five feet to the reciprocal of one foot. Also provided in accordance with the present invention is a marking on the club head of the putter, the marking serving to assist with both aiming and centering. The marking is an arc of a concentric circle of the golf ball in front of the putter face and has a radius of curvature which is a function of the radius from the center point of a golf ball abutting the striking face. The marking may be used on putters having regular, non-concave striking faces.

52 Claims, 5 Drawing Sheets

GOLF PUTTER HAVING IMPROVED MARKING

Matter enclosed in heavy brackets [ ] appears in the original patent but forms no part of this reissue specification; matter printed in italics indicates the additions made by reissue.

CROSS REFERENCE TO RELATED APPLICATIONS

*This application is a reissue of 09/520,159, filed on Mar. 7, 2000 now U.S. Pat. No. 6,409,610, which is a continuation-in-part of 09/114,523, filed on Jul. 13, 1998 now U.S. Pat. No. 6,045,452.*

FIELD OF THE INVENTION

This invention relates to an improved design of a golf putter. More particularly, it relates to a putter having an improved marking enabling a golfer to more accurately line up the putt.

BACKGROUND OF THE INVENTION

Putting is very important in the game of golf. On a par-72 course, one-half (36) strokes are allotted for putting. Moreover, it does not take great strength or physical ability to be a good putter. For a golfer, one stroke on a green counts just as much as any other stroke in the course.

There are two kinds of putts—long putts and short putts. A long putt may be defined as any putting requiring more than five feet to reach the cup. If the ball lies within about five feet of the hole, it is a short putt. The primary objective of the long putting is to hit the ball so that it ends within approximately three feet of the hole. Although sinking the ball in a long put is pleasant and desirable, the primary goal on long putts should be placing the ball near enough to the hole so that the next stroke will easily make the hole. In addition, for the long putts many variables such as the slope of the ground, the accuracy of the aim, the length to be traveled, and speed of the ball comes into play. The accuracy of the aim, although critically important, only plays a minor role in the overall success of the long putting. On the other hand, the accuracy is the most important factor in short putting. Other variables such as the slope of the ground, speed of the ball, and texture of the turf become less important. A short putt is very important in a game of golf not only because a missed putt will cost a stroke, but the impact it has psychologically to a player. Because of its length, every golfer, pros and amateurs alike, feels compelled to make it. When he does not make it, he thinks he missed an easy shot. Consequently, it tends to destroy a player's confidence and may affect his concentration for the rest of the game.

In a putting situation, the direction of the putt is dictated by the path of the clubhead and the face angle at impact. The path is important and affects direction, but the face angle of the putter at impact is also very important in determining direction. Providing the green within five feet of the hole has no significant slope and texture of the turf is uniform, successful short putting should require the path of the clubhead directly aimed to center of the hole, and club face angle precisely perpendicular to the line between clubhead and the hole. In addition, the center of the ball should be precisely aligned with the marker on top of the putter that generally indicates location of the center of gravity in the toe to heel direction. An infinitesimal deviation from these is the reason for a miss of the short putt. To miss the hole that is four inches wide, from five feet distance the deviation of a face angle from perpendicular to the straight line to the hole must be so small it will not be discernable to the naked eyes. Every player carefully adjusts the face angle of the putter and aligns the ball to the center of gravity marker before he strokes the ball. Nevertheless, a putt is missed because the face of the putter is not truly perpendicular to the direction of the hole, and the ball is off the center of gravity. To achieve a perfect alignment every time, a finely adjusted machine toll is needed. Since hand and eye coordination of a human being is much less precise than a machine, a mistake will occur and a missed putt is the result. The present invention is directed to reducing the small inaccuracies that occur with the prior art putters and automatically compensating for mis-struck putts.

SUMMARY OF INVENTION

Accordingly, it is a primary object of the present invention to provide an improved golf putter which automatically compensates for misaligned and mis-struck putts in a short putting situation. A typical putter consists of a putter head about four to five inches long with a predetermined weight distribution and a total weight ranging between fifteen and eighteen ounces. The putting face of a putter is horizontally flat and has two to four degrees of loft. There are many putter designs in the market each claiming why it is superior to others. However, for the short putting situation; the most important attribute of a putter has to be how tolerant making up the infinitesimal and almost invisible error in positioning the face angle and the clubhead path a player makes when the player aims and strokes a ball. If there is a putter with a face shaped such a way that the ball is always aimed toward the center of the hole, probability of making the hole increases significantly even when a player makes a small error in aiming the ball toward the hole. Additionally, putter markings are usually taken for granted, consisting of one or several straight lines. A putter with an enhanced marking would assist the golfer with both centering and aiming the putt.

It is desirable to have an alignment on the top of the surface of a putter to aid a player to aim the ball as precisely as possible. The alignment marker will consist of a line perpendicular to the putter face located precisely at the center of gravity of the club head, and a curved horizontal face marker which is an arc of a concentric circle of a golf ball placed abutting or one quarter of an inch in front of the hitting face of the putter. With the horizontal face marker being a concentric circle of the golf ball, the distance between the ball and face marker will be symmetrical and equal along the entire arc of the marker when the ball is aligned properly. However. if the ball is misaligned, the distance between the ball and the marker will be different between the toe-end and the heel-end of the marker, enabling the player to make an adjustment easily. With the alignment marker enabling a player to align the ball more accurately and the concave putter further compensating any misalignment, the improved putter of present invention will enable a player to putt more accurately than a conventional putter.

The putter of the present invention differs from any other conventional or unconventional style putters in the market today. The putter may be precision machined to form a concave horizontal face from the heel to toe of the hitting face.

The curvature of the concave horizontal face may range from an arc of a five to a one-foot radius circle with the center point at the center of the hole. The curvature is defined as the reciprocal of the radius of a circle. Also provided in accordance with the present invention is a marking on the club head, the marking serving to assist with both aiming and centering.

The best way to hit the golf ball in a short putt is like a pendulum. The most golfers cannot do that consistently, but they tend to swing in an arc. Depending on when the putter strikes the ball in that arc, the putter face may be either slightly open or slightly closed at the impact. Because the concave putter always aims a ball toward the center of the hole, slightly open or closed face hit is compensated enough to make the ball to drop into the hole.

Additionally, for right-handed golfers with conventional putters, balls stroked on the inside the sight line toward the heel will travel left of the intended line to the hole. Previous tests show that an average golfer almost always impacts on the toe side of the sight line making the ball to travel right of the intended line to the hole. This is so because the player never looks down at the putter head and ball from directly above, but slightly to the heel side of the sight line. The amount of the offset is very small and almost invisible; but, a small misalignment will result in a missed putt. Since a curved sight line marker enables a golfer to more accurately line up the a putt, the concave putter will compensate the small misalignment and make the ball drop into the hole by automatically aiming the ball toward the center of the hole.

Tests performed on a flat putting green showed that putts stroked with a straight putter resulted in 20 percent traveling on a line left of center and 20 percent traveling right of the center. Of putts stroked with the concave putter, only 10 percent went left of center and 10 percent went right of the center—a statistically significant improvement.

DETAILED DESCRIPTION OF THE INVENTION

Figure 1:
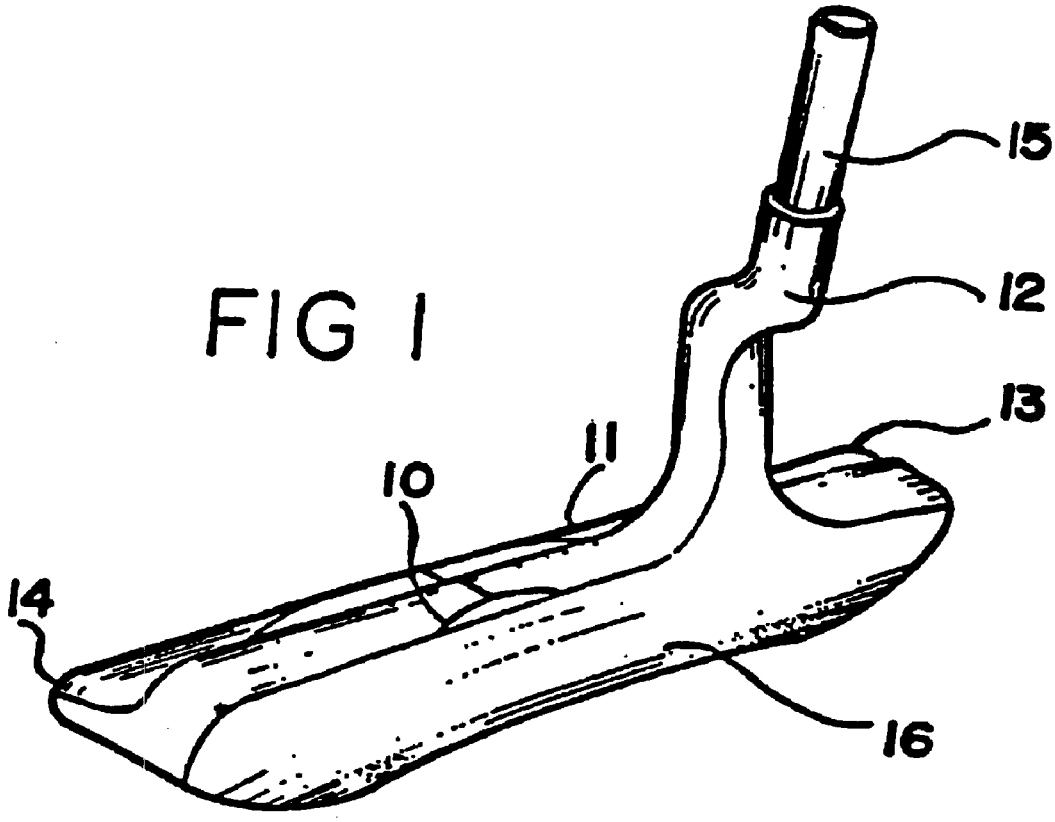
FIG. 1 is a perspective view of a putter made in accordance with the present invention having the concave horizontal putting face.
Figure 2:
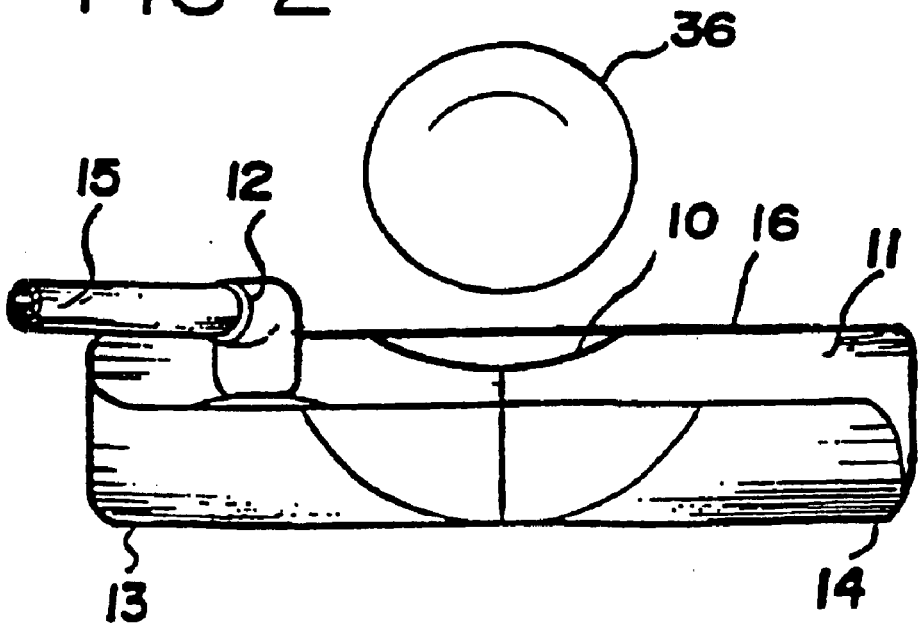
FIG. 2 is a top plan view of a putter of the present invention.
Figure 3:
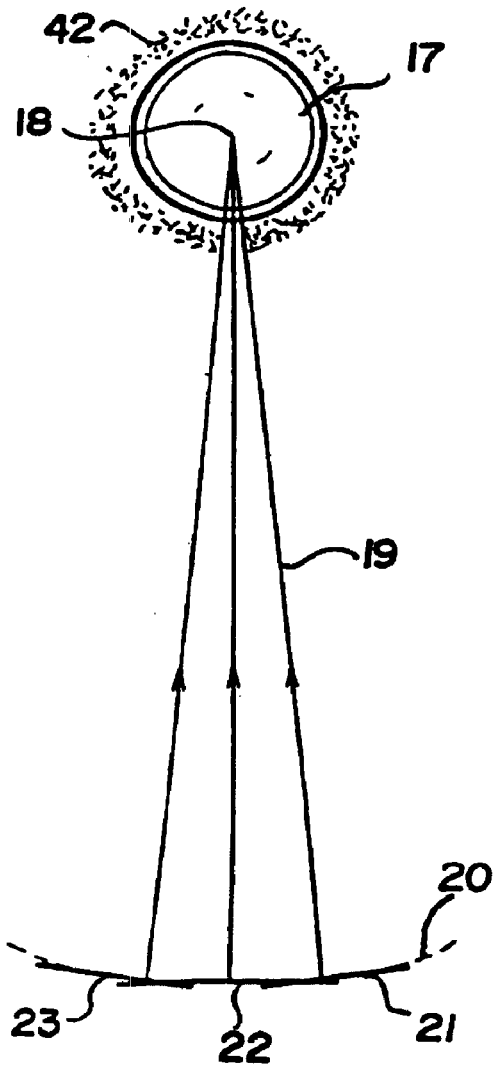
FIG. 3 is a view of an arc formed by a circle drawn from a center of the hole.
Figure 4:
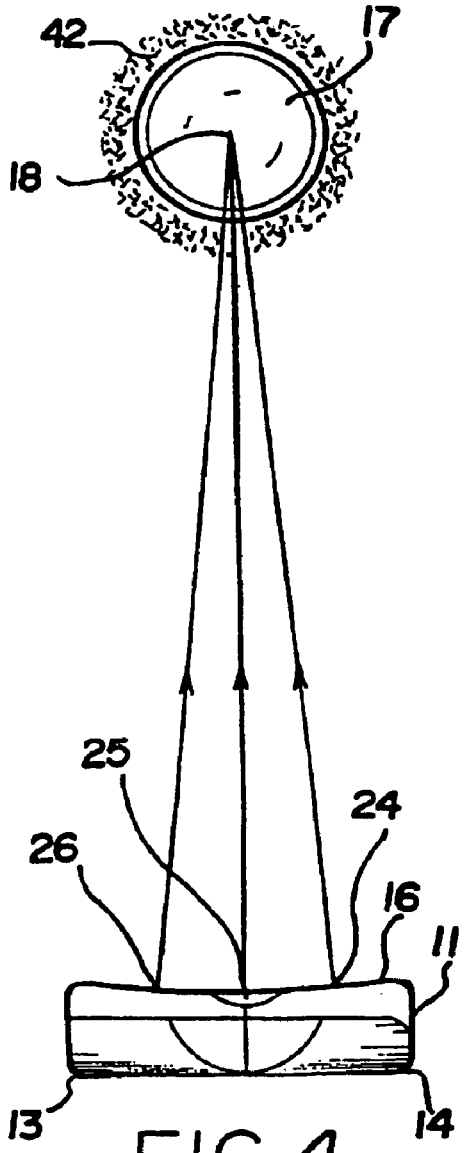
FIG. 4 is a top plan view of a concave horizontal putter with paths of a ball hit at any point of the putter face.
Figure 5:
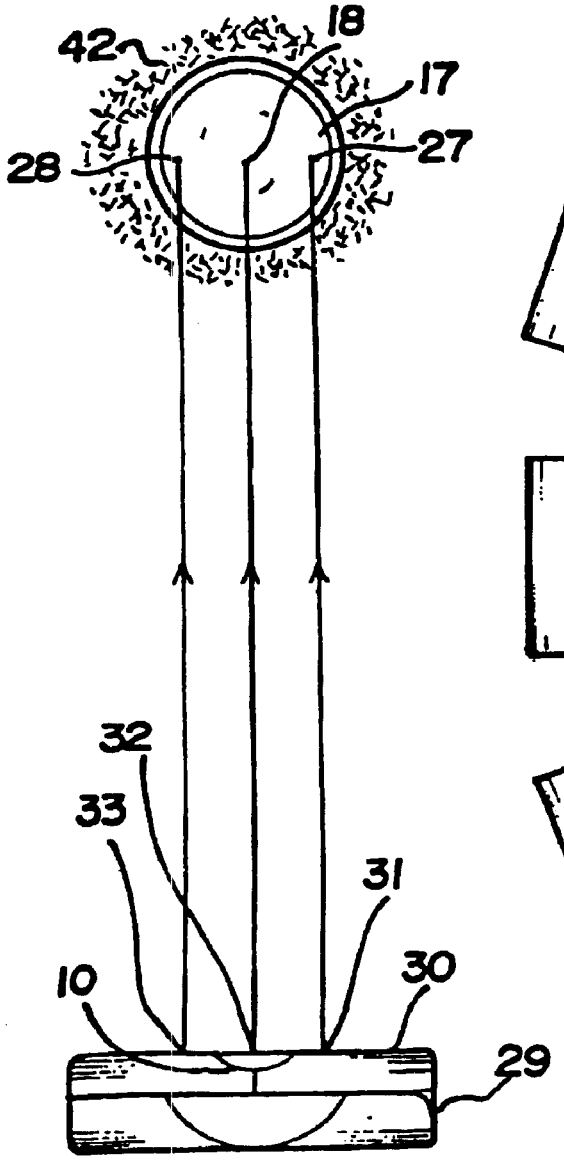
FIG. 5 is a top plan view of a conventional straight faced putter with the path of a ball hit at three different points of the putter face.

Reference is now made to the drawing figures showing the improved golf putter 11 illustrated in FIG. 1 and FIG. 2. The putter shown in the drawing is a typical heel and toe weighted putter, but the putter of any other configuration such as a blade-type putter may be used. Regardless of the type, all putters have a club head 9, the club head having a front face 16 which is used to strike the ball, a heel 13, a toe 14, a hosel 12, and a shaft 15. In most of the putter design, the horizontal surface of the face 16 of the putter is flat. In the preferred embodiment of the invention, the face 16 of the putter 11 is curved forming a concave horizontal surface. Curvature of the face 16 of the preferred embodiment is equivalent to the curvature of a circle 20 formed with the center 18 of the hole 17 and radius 19 ranging from five feet to three feet in length as illustrated in FIG. 3. Tangential lines 21, 22, 23 drawn at any point on the circle 20 represent ideal face angles of a putter in order to hit a ball perfectly aimed at the center of the hole. FIG. 4 and FIG. 5 schematically illustrate advantages of the preferred embodiments of the invention 11 over a conventional putter 29. When a ball is hit with the putter of present invention 11, the ball will travel toward the center point 18 of the hole 7 no matter where the impact points 24, 25, 26 are as long as the putter face is aligned perpendicularly toward the hole. However, when a ball is hit with a conventional putter 29, only the ball impacted at the center point of the putter 32 will travel toward the center point 18 of the hole 17. The balls impacted at the points 33, 31 offset from the center 32 will end up at points 27, 28 other than the center point 18, increasing the probability of missing the hole. Statistically, balls traveling toward the center point 18 have significantly higher probability of making the hole than balls traveling toward off-center points 27, 28.

Figure 6:
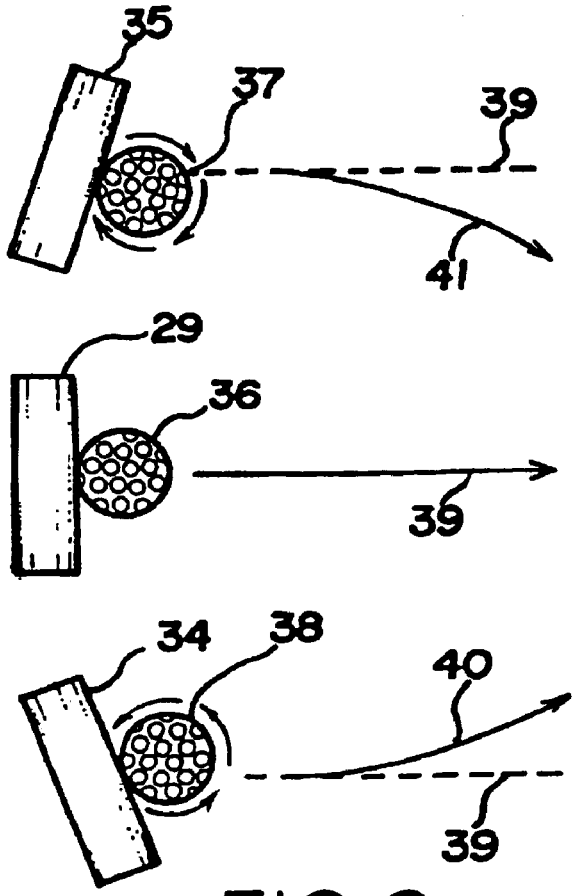
FIG. 6 is a top plan view of the travel path of the ball when the putter face is open, straight, and closed.

FIG. 6 schematically describes paths of a ball hit with the putter's face with a straight face 29, a closed face 35, and open face 34. When a ball 36 is hit with the putter face 29 perpendicular to the hole, the ball 36 will travel straight 39 path with no side spin.

When a ball 37 is hit with a closed face putter 35, the ball 37 will have slight clockwise side spin and tends to travel right 41 of the center 39. When a ball is hit with an open face putter 34, the ball 38 will have slight counterclockwise side spin and tends to travel left 40 of the center. Since the present invention tends to aim the center point of the hole, small deviation from the straight path is compensated with the concave putter, and a higher percentage of the ball drops into the cup.

Figure 7:
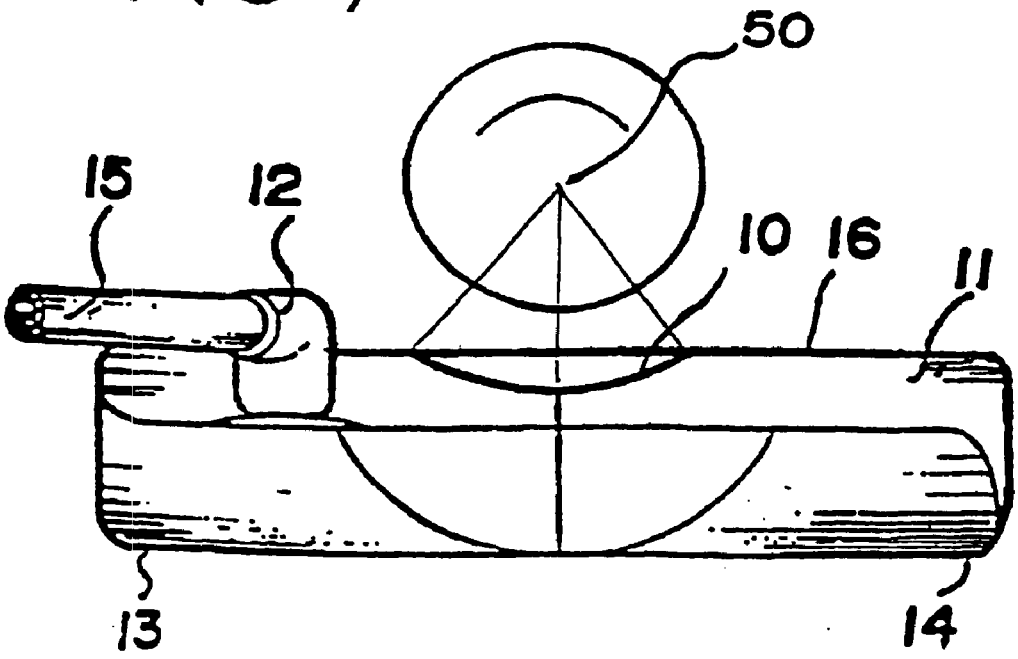
FIG. 7 is a top plan view of the putter of the present invention detailing the relationship of the marking to the radius of the golf ball.

In order to assist with aiming, most putters have one or more markings formed on the top face. These markings are generally in the form of one or more straight lines which point in the direction of the hole when the club face is properly oriented. The marking 10 of the club 11 of the present invention consists of a straight line terminating at an arc, the arc having end points terminating at the club face 16. In accordance with the preferred embodiment, the radius of the arc is the length of a line running from the center of a golf ball 50 [abutting] *near* the front face 16 of the club 11 as may be seen in FIG. 7. Thus, the curvature of the arc of the marking 10 is preferably a function of the distance from the center point of a golf ball 50 abutting the striking face 16, to the point at which the straight line of the marking 10 terminates. The marking 10 aids a golfer by providing a line pointing to the hole as well as a means for assisting with centering the club face 16. The marking 10 may be formed by scoring an arc in the top of the club head 9, and filling in the arc with the desired color paint.

Figure 8:
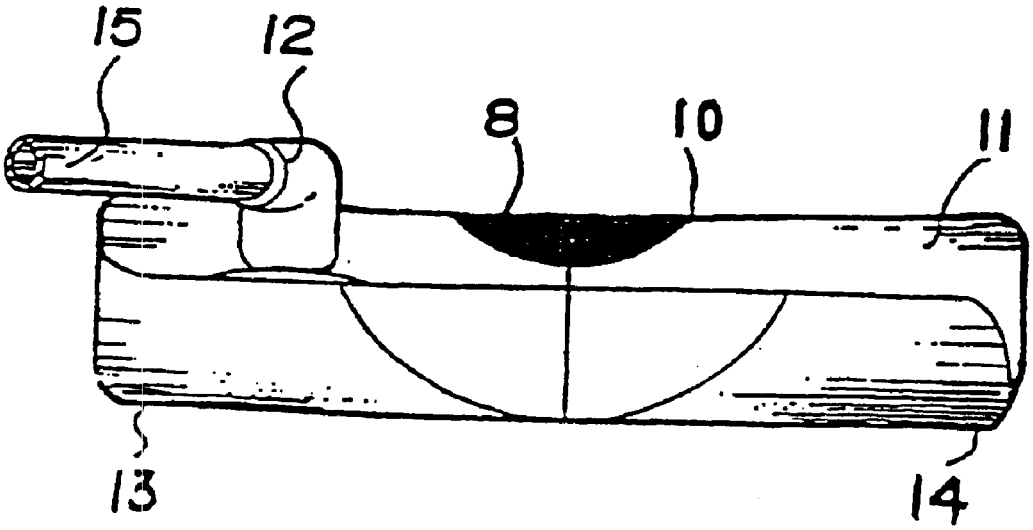
FIG. 8 is a top plan view of a putter of the present invention having an alternative marking.
Figure 9:
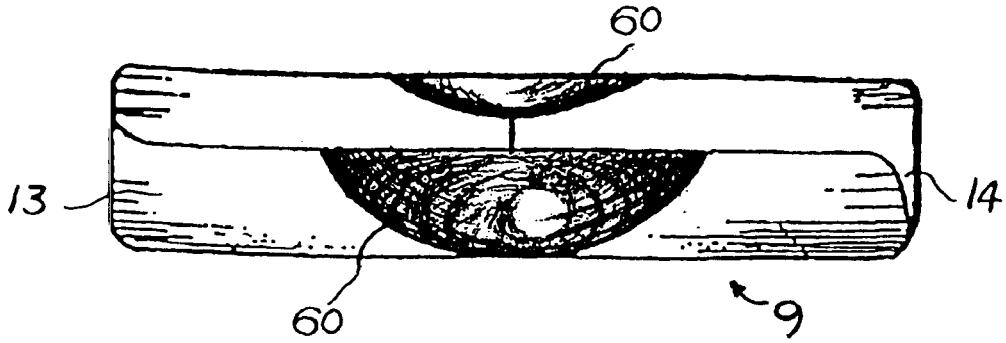
*FIG. 9 is a top plan view of a putter of the present invention having a marking formed by a raised portion.*
Figure 10:
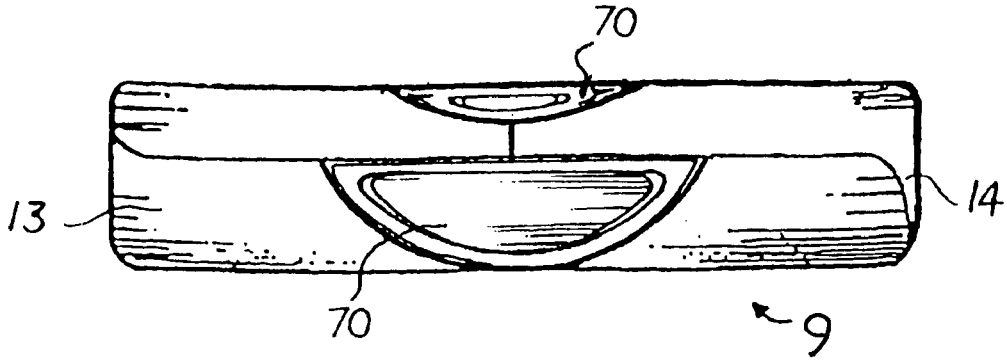
*FIG. 10 is a top plan view of a putter of the present invention having a marking formed by a sunken portion.*

An alternative form of the marking 10 is shown in FIG. 8. This form of the marking 10 is characterized by a solid color arcuate section having a radius as defined above. It should be noted that the primary purpose of the marking 10 is to assist the golfer in aiming and centering the putt. Accordingly, the only requirement for the marking 10, other than having the radius as defined above, is that it be clearly visible to the golfer as he looks down on the club head 9 to center the putt. Thus, the marking 10 may be formed by a raised portion *60*, a sunken portion *70*, or an otherwise contoured arcuate portion [(not shown)] *as depicted, for example, in FIG. 9 and FIG. 10*, which may or may not require coloring in order to be easily visualized by the golfer.

Advantages the preferred embodiment offers over the conventional putter apply to any type of putter design. While the preferred embodiments described herein set forth the best mode to practice this invention presently contemplated by the inventors, numerous modifications and adaptations of this invention will be apparent to others skilled in the art. Therefore, the embodiments are to be considered as illustrative and exemplary and it is understood that the claims are intended to cover such modifications and adaptations as they are considered to be within the scope of the invention.

What is claimed is:

1. A golf putter comprising:

a putter head, a hosel attached to the putter head, a shaft receiver on the hosel for receiving a shaft, the putter head having a heel portion at one end and a toe portion at the other end, a striking face, and a contoured top surface;

a marking formed on said contoured top surface, said marking having a straight line portion and a curved portion, said curved portion having a radius of curvature which is equivalent to a radius of curvature of a circle having a radius extending from an approximate center point of a regulation size golf ball to a point where said straight line portion bisects said curved portion of said marking when a golf ball is abutting said striking face.

2. The putter of claim 1 wherein said marking is formed by an arc scored in the top of the club head.

3. The putter of claim 2 wherein said arc is delineated by paint or other coloring.

4. The putter of claim 1 wherein said marking formed by a raised portion on said contoured top surface.

5. The putter of claim 1 wherein said marking is formed by contrasting color sections formed on said top surface.

*6. The putter of claim 1 wherein said marking is formed by a sunken portion.*

*7. The putter of claim 1 wherein said marking is formed by a contoured arcuate portion.*

*8. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face;*

*wherein said marking includes a straight portion and a curved portion, said curved portion having a radius of curvature substantially equivalent to a radius of curvature of a circle having a radius extending from an approximate center point of a regulation size golf ball to a point where said straight portion bisects said curved portion when the golf ball is near or abutting said striking face.*

*9. The putter head of claim 8, wherein said marking is formed by a scored portion.*

*10. The putter head of claim 8, wherein said marking is formed by a colored portion.*

*11. The putter head of claim 8, wherein said marking is formed by a raised portion.*

*12. The putter head of claim 8, wherein said marking is formed by a sunken portion.*

*13. The putter head of claim 8, wherein said marking is formed by a contoured arcuate portion.*

*14. The putter head of claim 8, wherein said marking is formed by contrasting color sections.*

*15. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a scored portion;*

*wherein said marking includes a curved portion, said curved portion having a radius of curvature larger than a golf ball and substantially equivalent to a radius of curvature of a circle having a radius extending from an approximate center point of a regulation size golf ball to said curved portion when said striking face is properly aligned with the golf ball and the golf ball is near or abutting said striking face.*

*16. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a colored portion;*

*wherein said marking includes a curved portion, said curved portion having a radius of curvature larger than a golf ball and substantially equivalent to a radius of curvature of a circle having a radius extending from an approximate center point of a regulation size golf ball to said curved portion when said striking face is properly aligned with the golf ball and the golf ball is near or abutting said striking face.*

*17. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a raised portion;*

*wherein said marking includes a curved portion, said curved portion having a radius of curvature larger than a golf ball and substantially equivalent to a radius of curvature of a circle having a radius extending from an approximate center point of a regulation size golf ball to said curved portion when said striking face is properly aligned with the golf ball and the golf ball is near or abutting said striking face.*

*18. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a sunken portion;*

*wherein said marking includes a curved portion, said curved portion having a radius of curvature larger than a golf ball and substantially equivalent to a radius of curvature of a circle having a radius extending from an approximate center point of a regulation size golf ball to said curved portion when said striking face is properly aligned with the golf ball and the golf ball is near or abutting said striking face.*

*19. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by contrasting color sections;*

*wherein said marking includes a curved portion, said curved portion having a radius of curvature larger than a golf ball and substantially equivalent to a radius of curvature of a circle having a radius extending from an approximate center point of a regulation size golf ball to said curved portion when said striking face is properly aligned with the golf ball and the golf ball is near or abutting said striking face.*

*20. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a scored portion;*

*wherein said marking includes a curved portion, said curved portion having a radius of curvature larger than a regulation size golf ball and forming an arc of a circle that is substantially concentric around the golf ball when said striking face is properly aligned with the golf ball and the golf ball is near to or abutting said striking face.*

*21. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a colored portion;*

*wherein said marking includes a curved portion, said curved portion having a radius of curvature larger than a regulation size golf ball and forming an arc of a circle that is substantially concentric around the golf ball when said striking face is properly aligned with the golf ball and the golf ball is near to or abutting said striking face.*

*22. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a raised portion;*

*wherein said marking includes a curved portion, said curved portion having a radius of curvature larger than a regulation size golf ball and forming an arc of a circle that is substantially concentric around the golf ball when said striking face is properly aligned with the golf ball and the golf ball is near to or abutting said striking face.*

*23. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by a sunken portion;*

*wherein said marking includes a curved portion, said curved portion having a radius of curvature larger than a regulation size golf ball and forming an arc of a circle that is substantially concentric around the golf ball when said striking face is properly aligned with the golf ball and the golf ball is near to or abutting said striking face.*

*24. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking is formed by contrasting color sections;*

*wherein said marking includes a curved portion, said curved portion having a radius of curvature larger than a regulation size golf ball and forming an arc of a circle that is substantially concentric around the golf ball when said striking face is properly aligned with the golf ball and the golf ball is near to or abutting said striking face.*

*25. A golf putter head comprising:*

*a heel portion at one end;*

*a toe portion at the other end;*

*a striking face arranged between said heel and toe portions; and*

*a marking arranged between said heel and toe portions, said marking disposed in relation to said striking face, wherein said marking includes a straight portion perpendicular to the striking face;*

*wherein said marking includes a curved portion, said curved portion having a radius of curvature larger than a regulation size golf ball and forming an arc of a circle that is substantially concentric around the golf ball when said striking face is properly aligned with the golf ball and the golf ball is near to or abutting said striking face.*

*26. The putter head of claim 25, wherein said marking is formed by a scored portion.*

*27. The putter head of claim 25, wherein said marking is formed by a colored portion.*

*28. The putter head of claim 25, wherein said marking is formed by a raised portion.*

*29. The putter head of claim 25, wherein said marking is formed by a sunken portion.*

*30. The putter head of claim 25, wherein said marking is formed by a contoured arcuate portion.*

*31. The putter head of claim 25, wherein said marking is formed by contrasting color sections.*

*32. A golf putter head comprising:*

*a heel portion at one end;*

*a toe portion at the other end;*

*a flat striking face extending from said heel portion to said toe portion; and*

*a marking arranged between said heel and toe portions, said marking disposed in relation to said flat striking face;*

*wherein said marking includes a curved portion, said curved portion having a radius of curvature larger than a golf ball and substantially equivalent to a radius of curvature of a circle having a radius extending from an approximate center point of a regulation size golf ball to said curved portion when said striking face is properly aligned with the golf ball and the golf ball is near or abutting said flat striking face.*

*33. The putter head of claim 32, wherein said marking is formed by a scored portion.*

*34. The putter head of claim 32, wherein said marking is formed by a colored portion.*

*35. The putter head of claim 32, wherein said marking is formed by a raised portion.*

*36. The putter head of claim 32, wherein said marking is formed by a sunken portion.*

*37. The putter head of claim 32, wherein said marking is formed by a contoured arcuate portion.*

*38. The putter head of claim 32, wherein said marking is formed by contrasting color sections.*

*39. A golf putter head comprising:*

*a heel portion at one end;*

*a toe portion at the other end;*

*a flat striking face extending from said heel portion to said toe portion; and*

*a marking arranged between said heel and toe portions, said marking disposed in relation to said flat striking face;*

*wherein said marking includes a curved portion, said curved portion having a radius of curvature larger than a regulation size golf ball and forming an arc of a circle that is substantially concentric around the golf ball when said striking face is properly aligned with the golf ball and the golf ball is near to or abutting said flat striking face.*

*40. The putter head of claim 39, wherein said marking is formed by a scored portion.*

*41. The putter head of claim 39, wherein said marking is formed by a colored portion.*

*42. The putter head of claim 39, wherein said marking is formed by a raised portion.*

*43. The putter head of claim 39, wherein said marking is formed by a sunken portion.*

*44. The putter head of claim 39, wherein said marking is formed by a contoured arcuate portion.*

*45. The putter head of claim 39, wherein said marking is formed by a contrasting color sections.*

*46. The putter head of claim 39, wherein said marking includes a straight portion perpendicular to the striking face.*

*47. The putter head of claim 46, wherein said marking is formed by a scored portion.*

*48. The putter head of claim 46, wherein said marking is formed by a colored portion.*

*49. The putter head of claim 46, wherein said marking is formed by a raised portion.*

*50. The putter head of claim 46, wherein said marking is formed by a sunken portion.*

*51. The putter head of claim 46, wherein said marking is formed by a contoured arcuate portion.*

*52. The putter head of claim 46, wherein said marking is formed by contrasting color sections.*

* * * * *